US012731435B2

(12) United States Patent
Li et al.

(10) Patent No.: US 12,731,435 B2
(45) Date of Patent: Sep. 8, 2026

(54) EARLY WARNING METHOD, APPARATUS, AND SYSTEM FOR NITROGEN CONCENTRATION IN INDUSTRIALIZED AQUAPONIC CIRCULATING WATER

(71) Applicant: China Agricultural University, Beijing (CN)

(72) Inventors: Daoliang Li, Beijing (CN); Chang Liu, Beijing (CN); Yingying Zheng, Beijing (CN)

(73) Assignee: China Agricultural University, Beijing (CN)

( * ) Notice: Subject to any disclaimer, the term of this patent is extended or adjusted under 35 U.S.C. 154(b) by 330 days.

(21) Appl. No.: 18/437,972

(22) Filed: Feb. 9, 2024

(65) Prior Publication Data

US 2024/0282146 A1 Aug. 22, 2024

(51) Int. Cl.

| | |
|---|---|
| ***G06K 9/00*** | (2022.01) |
| ***A01K 63/04*** | (2006.01) |
| ***G06T 7/207*** | (2017.01) |
| ***G06V 20/52*** | (2022.01) |
| ***G06V 40/20*** | (2022.01) |

(52) U.S. Cl.
CPC .............. *G06V 40/20* (2022.01); *A01K 63/04* (2013.01); *G06T 7/207* (2017.01); *G06V 20/52* (2022.01)

(58) Field of Classification Search
CPC ........ G06V 40/20; G06V 20/52; G06V 10/82; G06V 20/40; A01K 63/04; G06T 7/207; G01N 21/84; G06Q 10/0635; G06Q 50/02
See application file for complete search history.

(56) References Cited

FOREIGN PATENT DOCUMENTS

| | | | | |
|---|---|---|---|---|
| CN | 109470831 A * | 3/2019 | ............. | B63H 21/17 |
| WO | WO-2024090653 A1 * | 5/2024 | ........... | A01G 31/065 |

* cited by examiner

*Primary Examiner* — Xin Jia
(74) *Attorney, Agent, or Firm* — Hahn Loeser & Parks LLP; John J. Cunniff

(57) ABSTRACT

The present disclosure provides an early warning method, apparatus, and system for a nitrogen concentration in industrialized aquaponic circulating water. The early warning method includes: obtaining video data of a sensitive fish farming container, where the video data includes a monitored movement behavior of a sensitive fish in the sensitive fish farming container, and the sensitive fish farming container is in communication with a farming pond of an aquaponic system; processing the video data using an object detection model and obtaining a behavior activity of the sensitive fish according to a processing result; processing the behavior activity using a neural network model to obtain a nitrogen concentration grade of the farming pond of the aquaponic system; and determining whether to send nitrogen concentration early warning information based on the nitrogen concentration grade.

14 Claims, 4 Drawing Sheets

EARLY WARNING METHOD, APPARATUS, AND SYSTEM FOR NITROGEN CONCENTRATION IN INDUSTRIALIZED AQUAPONIC CIRCULATING WATER

CROSS REFERENCE TO RELATED APPLICATION

This patent application claims the benefit and priority of Chinese Patent Application No. 202310188705X, filed with the China National Intellectual Property Administration on Feb. 21, 2023, the disclosure of which is incorporated by reference herein in its entirety as part of the present application.

TECHNICAL FIELD

The present disclosure relates to the technical field of aquaponics, and in particular, to an early warning method, apparatus, and system for monitoring a nitrogen concentration in industrialized aquaponic circulating water.

BACKGROUND

Aquaponics is a novel compound farming system in which scientific coordinate symbiosis of fish, vegetable, and microorganism is achieved through a delicate ecological design of aquaculture and hydroponics, thereby achieving the ecological symbiotic effects of not changing fish-farming water with no water quality hardship and enabling normal growth of vegetables with no fertilizer applied. In an aquaponic system, ammonia nitrogen is mainly generated, on the one hand, by the decomposition of organic matters such as fish excrement and left-over feed by microorganisms through ammonization, and on the other hand, by fish discharging into water through gill and urine. The ammonia nitrogen in circulating water oxidizes $NH_4^+$ into nitrite ($NO_2^-$) under the action of ammonia oxidizing bacteria (AOB) through nitrification, and the generated $NO_2^-$ is oxidized into nitrate ($NO_3^-$) by nitrite oxidizing bacteria (NOB) to be absorbed and utilized by planted vegetables. However, an excessively high nitrogen content will inhibit fish growth. Therefore, it is necessary to detect the nitrogen content in the aquaponic system and give an early warning.

Existing aquaponic water nitrogen detection methods mainly include the following two methods: one is a spectral analysis method in which concentration detection is achieved by measuring a wavelength and intensity of emitted, absorbed, or scattered radiation generated by nitrogen and derivatives thereof using an optical spectrum instrument; and the other one is to carry out intelligent detection using an electrochemical sensor by performing indirect measurement, i.e., converting a measurable electrical correlation parameter such as a potential difference, a current, or a voltage generated by a nitrogen solution and organic membrane into a nitrogen content.

The method of detecting a nitrogen content in water based on an electrochemical sensor is simple to operate but short in service life, and an electrode may be easily polluted by aquaculture water and needs to be replaced frequently. Moreover, this method has the disadvantages of narrow linear range, poor anti-interference capability, etc. The spectral detection method is more practical and operable and is most commonly used in detecting nitrogen in actual aquaculture water. The nitrogen detection method using an optical spectrum instrument has the advantages of high sensitivity, easy instrument operation, and low maintenance cost, but may be easily interfered by other interfering ions and water colors in use. Especially in seawater aquaculture water detection, due to complicated pretreatment process, insufficient detection accuracy, and slow detection, manual field measurement is required, and online detection cannot be realized. To improve the nitrogen detection efficiency of a modern aquaculture aquaponic system, Internet of Things of sensors based on electrochemical and spectral detection principles has been gradually utilized in practical production, but sensors still have the problems of short service life, high failure probability, serious down phenomenon, and the like. Therefore, sudden nitrogen change may be detected not in time, and effective early warning may not be given for toxic nitrogen in aquaculture water. To overcome the shortcomings of existing detection methods, there is an urgent need for an effective nitrogen early warning method.

SUMMARY

The present disclosure provides an early warning method, apparatus, and system for a nitrogen concentration in industrialized aquaponic circulating water to realize rapid early warning on a nitrogen concentration in an aquaponic system.

The present disclosure provides an early warning method for a nitrogen concentration in industrialized aquaponic circulating water, including:

- obtaining video data of a sensitive fish farming container, wherein the video data includes a monitored movement behavior of a sensitive fish in the sensitive fish farming container, and the sensitive fish farming container is in communication with a farming pond of an aquaponic system;
- processing the video data using an object detection model and obtaining a behavior activity of the sensitive fish according to a processing result;
- processing the behavior activity using a neural network model to obtain a nitrogen concentration grade of the farming pond of the aquaponic system; and
- determining whether to send nitrogen concentration early warning information based on the nitrogen concentration grade.

According to the early warning method for a nitrogen concentration in industrialized aquaponic circulating water provided in the present disclosure, the behavior activity includes an activity amount, acceleration times, and tail wagging times.

According to the early warning method for a nitrogen concentration in industrialized aquaponic circulating water provided in the present disclosure, the processing of the video data using an object detection model and obtaining a behavior activity of the sensitive fish according to a processing result may include:

- decomposing the video data into a plurality of top-viewing image frames and side-viewing image frames according to a preset unit time, wherein the video data includes top-viewing video data and side-viewing video data;
- performing object detection on the sensitive fish in the top-viewing image frames and the side-viewing image frames using the object detection model and obtaining a three-dimensional movement locus of the sensitive fish according to an object detection result;
- obtaining a movement distance of the sensitive fish in each preset unit time according to the three-dimensional movement locus; and accumulating a plurality of movement distances to obtain the activity amount of the sensitive fish within a video duration of the video data.

According to the early warning method for a nitrogen concentration in industrialized aquaponic circulating water provided in the present disclosure, the processing of the video data using an object detection model and obtaining a behavior activity of the sensitive fish according to a processing result may further include:

obtaining a movement velocity of the sensitive fish in each preset unit time according to the three-dimensional movement locus and the movement distance; and comparing the movement velocity with a preset movement velocity threshold and determining the acceleration times of the sensitive fish within the video duration according to a comparison result.

According to the early warning method for a nitrogen concentration in industrialized aquaponic circulating water provided in the present disclosure, the processing of the video data using an object detection model and obtaining a behavior activity of the sensitive fish according to a processing result may further include:

performing object detection on a tail of the sensitive fish in each side-viewing image frame using the object detection model and obtaining an area proportion of the tail in a first preset label box;

when the area proportion is less than a preset proportion value, determining that the sensitive fish has a tail wagging behavior within the preset unit time; and determining the tail wagging times of the sensitive fish within the video duration according to a number of the tail wagging behaviors.

According to the early warning method for a nitrogen concentration in industrialized aquaponic circulating water provided in the present disclosure, the processing the video data using an object detection model and obtaining a behavior activity of the sensitive fish according to a processing result may further include:

performing object detection on the tail of the sensitive fish in each top-viewing image frame using the object detection model and obtaining a position of the tail in a second preset label box; and when the position does not coincide with a preset reference line within the second preset label box, determining that the sensitive fish has a tail wagging behavior within the preset unit time; and determining the tail wagging times of the sensitive fish within the video duration according to a number of the tail wagging behaviors.

According to the early warning method for a nitrogen concentration in industrialized aquaponic circulating water provided in the present disclosure, the processing the behavior activity using a neural network model to obtain a nitrogen concentration grade of the farming pond of the aquaponic system may include:

inputting the activity amount, the acceleration times, and the tail wagging times to the neural network model; and predicting a nitrogen concentration in the farming pond of the aquaponic system using the neural network model and determining the nitrogen concentration grade according to a prediction result.

According to the early warning method for a nitrogen concentration of an aquaponic system provided in the present disclosure, the neural network model is a mode established with a long short-term memory (LSTM) model as a framework.

The present disclosure further provides an early warning apparatus for a nitrogen concentration in industrialized aquaponic circulating water, including:

a first obtaining module configured to obtain video data of a sensitive fish farming container, wherein the video data includes a monitored movement behavior of a sensitive fish in the sensitive fish farming container, and the sensitive fish farming container is in communication with a farming pond of an aquaponic system;

a second obtaining module configured to process the video data using an object detection model and obtain a behavior activity of the sensitive fish according to a processing result;

a third obtaining module configured to process the behavior activity using a neural network model to obtain a nitrogen concentration grade of the farming pond of the aquaponic system; and a fourth obtaining module configured to determine whether to send nitrogen concentration early warning information based on the nitrogen concentration grade.

The present disclosure further provides an early warning system for a nitrogen concentration in industrialized aquaponic circulating water, including: a sensitive fish farming container, a photographing apparatus, and a computer device, where the sensitive fish farming container is in communication with a farming pond of an aquaponic system such that a fluid flows in the farming pond and the sensitive fish farming container; the photographing apparatus is connected to the computer device;

the sensitive fish farming container is configured to farm a sensitive fish;

the photographing apparatus is configured to collect video data of the sensitive fish farming container, monitor a movement behavior of the sensitive fish, and transmit the video data to the computer device; and the computer device is configured to obtain a nitrogen concentration grade of the aquaponic system and determine whether to send nitrogen concentration early warning information based on the nitrogen concentration grade.

The early warning method, apparatus, and system for a nitrogen concentration in industrialized aquaponic circulating water provided in the present disclosure can obtain the nitrogen concentration of the aquaponic system by farming the sensitive fish using water in the farming pond of the aquaponic system, picking up a video of the sensitive fish using the photographing apparatus, monitoring the movement behavior of the sensitive fish, performing object detection on the video data using the object detection model to obtain the behavior activity of the sensitive fish (the fish has different behavior activities in water environments at different nitrogen concentrations), and obtaining the nitrogen concentration corresponding to the behavior activity of the sensitive fish using the neural network model, and can determine whether early warning information is transmitted based on the nitrogen concentration, allowing a worker to know rapidly. The present disclosure provides a non-contact detection method using the computer vision technology, which does not require destructive operations such as individual dissection to be performed on fish and vegetable in the aquaponic system. Besides, changes may occur rapidly in fish behaviors due to a change in nitrogen concentration in water, and such changes may be more significant and earlier than inherent physiological changes. The behavior response of the sensitive fish used in the present disclosure is more significant and earlier than that of a farmed fish with an economic value in the farming pond of the aquaponic system. Thus, the present disclosure allows for rapid and accurate diagnosis of the nitrogen concentration in water of the aquaponic system, and early warning, thereby guaranteeing the survival of the farmed fish with high economic value in the aquaponic system. Furthermore, the cheap sensitive fish is used as a detection object, resulting in a low cost. Moreover, compared with an optical spectrum instrument and a sensor in the prior art, the early warning system of the present disclosure is low in failure rate, low in operation and maintenance costs, and capable of real-time monitoring. The problems of unstable early warning, low efficiency, and the like for a nitrogen concentration in the aquaponic system can be effectively solved. Thus, the healthy growth status of the farmed fish in the aquaponic system can be fed back in real time.

BRIEF DESCRIPTION OF THE DRAWINGS

To describe the technical solutions in the present disclosure or in the prior art more clearly, the following briefly describes the accompanying drawings required for describing the embodiments or the prior art. Apparently, the accompanying drawings in the following description show some embodiments of the present disclosure, and a person skilled in the art may still derive other accompanying drawings from these accompanying drawings without creative efforts.

LIST OF REFERENCE NUMERALS

Figure 1:
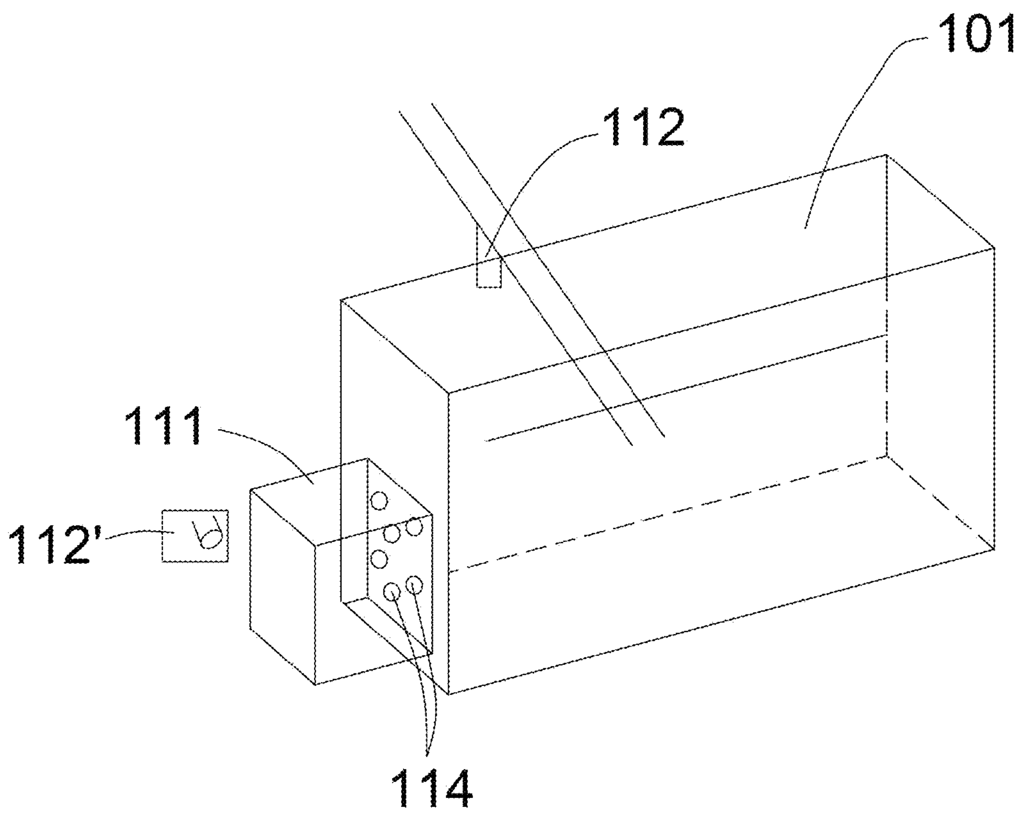
FIG. 1 is a schematic diagram of an application scenario of an early warning system for a nitrogen concentration in industrialized aquaponic circulating water provided in the present disclosure.

101—farming pond; 111—sensitive fish farming container; and 112/112'—image pick-up apparatus.

DETAILED DESCRIPTION OF THE EMBODIMENTS

To make the objectives, technical solutions and advantages of the present disclosure clearer, the following clearly and completely describes the technical solutions in the present disclosure with reference to the accompanying drawings in the present disclosure. Apparently, the described embodiments are some but not all of the embodiments of the present disclosure. All other embodiments derived from the embodiments of the present disclosure by a person of ordinary skill in the art without creative efforts shall fall within the protection scope of the present disclosure.

It should be noted that in the description of the embodiments of the present disclosure, terms "including", "comprising" or any other variants thereof are intended to cover non-exclusive inclusion, so that a process, method, article or device including a series of elements includes not only those elements but also other elements not explicitly listed, or elements inherent to such a process, method, article, or device. Without more restrictions, the elements defined by the sentence "including a . . . " do not exclude the existence of other identical elements in a process, method, article, or device including the elements. An orientation or positional relationship indicated by a term such as "upper" or "lower" is based on the orientation or positional relationship shown in the accompanying drawings, which is only for convenience of describing the present disclosure and simplifying the description, rather than indicating or implying that the apparatus or element referred to must have a particular orientation and be constructed and operated in a particular orientation, and therefore should not be construed as limiting the present disclosure. Unless otherwise clearly specified and limited, the terms "installed", "connected with", and "connected to" should be understood in a board sense. For example, the connection may be a fixed connection, a detachable connection or an integrated connection, may be a mechanical connection or an electrical connection, may be a direct connection or an indirect connection with use of an intermediate medium, or may be intercommunication between two components. Those of ordinary skill in the art may understand specific meanings of the above terms in the present disclosure based on a specific situation.

The terms such as "first" and "second" in the present disclosure are used to distinguish between similar objects and are not intended to describe a specific order or sequence. It should be understood that data used in such a way may be interchanged under appropriate circumstances so that the embodiments of the present application can be implemented in an order other than those illustrated or described herein, the objects distinguished by "first", "second", etc. are usually of one type, and the number of objects is not limited. For example, one or more first objects may be provided. In addition, "and/or" means at least one of the connected objects, and the character "/" generally indicates an "or" relationship between associated objects.

The present disclosure provides an early warning system for a nitrogen concentration in industrialized aquaponic circulating water, including: a sensitive fish farming container, a photographing apparatus, and a computer device. The sensitive fish farming container is in communication with a farming pond of an aquaponic system such that a fluid flows in the farming pond and the sensitive fish farming container. The photographing apparatus is connected to the computer device. The sensitive fish farming container is configured to farm a sensitive fish. The photographing apparatus is configured to collect video data of the sensitive fish farming container, monitor a movement behavior of the sensitive fish, and transmit the video data to the computer device. The computer device is configured to obtain a nitrogen concentration grade of the aquaponic system and determine whether to send nitrogen concentration early warning information based on the nitrogen concentration grade.

As shown in FIG. 1, an actual application scenario of an early warning system for a nitrogen concentration in industrialized aquaponic circulating water of the present disclosure is shown. The early warning system for a nitrogen concentration in industrialized aquaponic circulating water includes: a sensitive fish farming container 111, a photographing apparatus 112, and a computer device (not shown). The sensitive fish farming container 111 is in communication with a farming pond 101 of an aquaponic system, guaranteeing water in the sensitive fish farming container 111 is in communication with water in the farming pond 101 and thus guaranteeing that a nitrogen concentration predicted with a behavior activity of a sensitive fish is the nitrogen concentration of the water in the farming pond of the aquaponic system. At least one sensitive fish may be farmed in the sensitive fish farming container 111.

In one embodiment, a plurality of through holes are formed at the joint of the sensitive fish farming container 111 and the farming pond 101. In one embodiment, a diameter of the through hole is smaller than sizes of the farmed fish and the sensitive fish so that the sensitive fish can be separated from the farmed fish, ensuring that the collected video data is the video data of the sensitive fish to monitor a movement behavior of the sensitive fish.

As shown in FIG. 1, for one sensitive fish farming container, the photographing apparatus may include two video cameras that are mounted above and beside the sensitive fish farming container 111 to collect top-viewing video data and side-viewing video data of the sensitive fish farming container 111, respectively. A video collection format may be mp4 format. To improve the accuracy of prediction, a plurality of sensitive fishes of a same type may be farmed in the sensitive fish farming container. In this case, if only test video data is collected, the sensitive fish may be covered, leading to a failure of obtaining the behavior activity of the sensitive fish with high accuracy. An accurate three-dimensional movement locus of the sensitive fish can be obtained by combining the top-viewing video data with the side-viewing video data, and an accurate behavior activity of the sensitive fish can be obtained so as to predict a nitrogen concentration with high accuracy.

In one embodiment, the photographing apparatus may be a binocular camera.

In one embodiment, the sensitive fish farming container may be made of a transparent acrylic material. In this way, the side-viewing video data and the top-viewing video data of the sensitive fish farming container can be collected conveniently.

In one embodiment, the photographing apparatus may transmit the collected video data to a computer device for background monitoring in real time via wireless communication.

It needs to be noted that fish is on top of the food chain in the aquaponic system, and usually, the influence of water quality on the movement behavior of fish is more intuitive and rapid. Sensitive fish refers to fish sensitive to water quality, for example fish having significant stress response to toxic nitrogen, such as zebra fish and rainbow trout. Therefore, different behaviors of the sensitive fish may directly reflect changes in toxic nitrogen content in water. The responses of these coercing behaviors are more rapid and intuitive and may give effective early warning on the changes in nitrogen concentration in water.

An early warning method for a nitrogen concentration in industrialized aquaponic circulating water in the present disclosure is described below with reference to FIG. 2.

Figure 2:
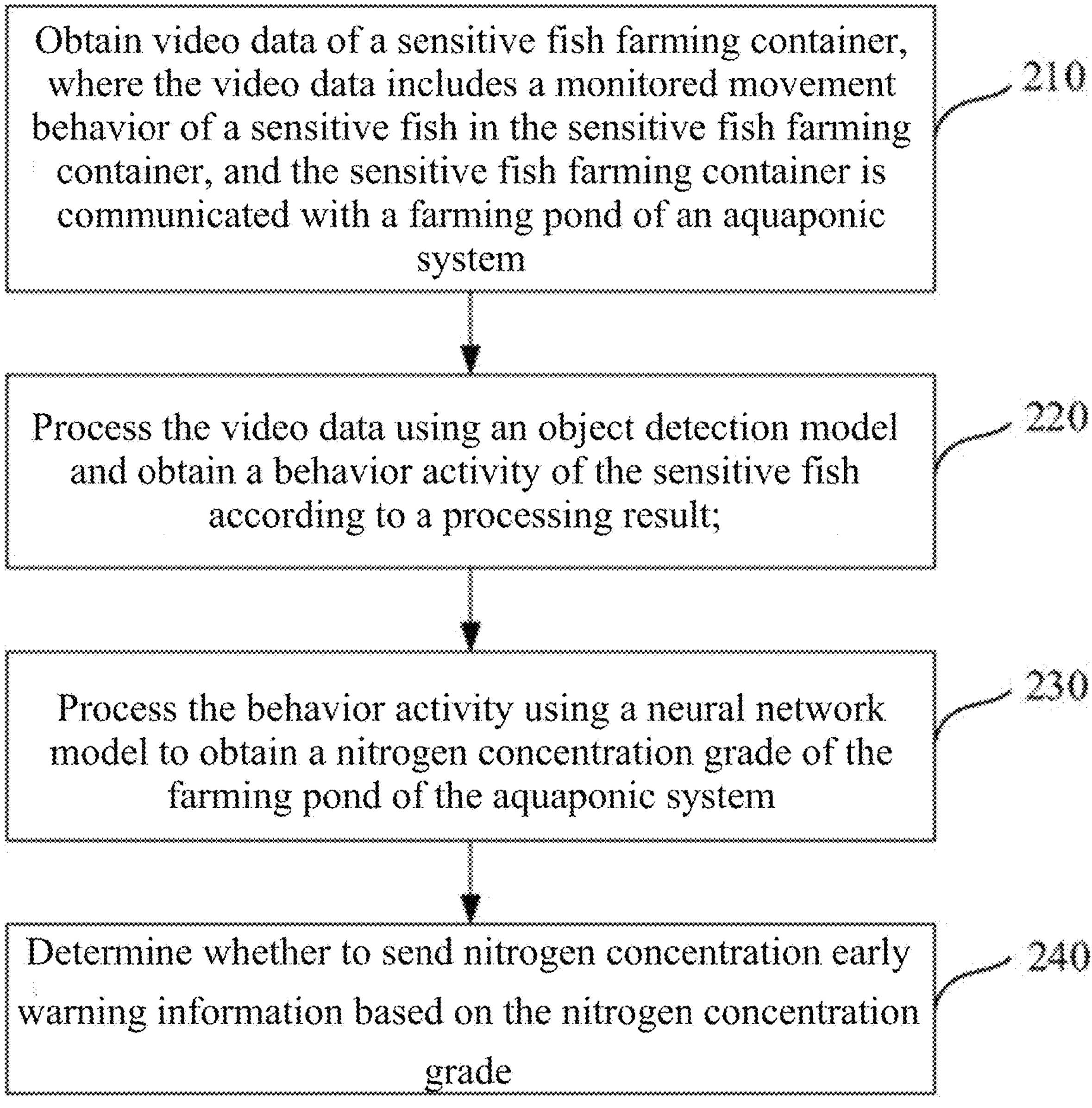
FIG. 2 is a flowchart of an early warning method for a nitrogen concentration in industrialized aquaponic circulating water provided in the present disclosure.

As shown in FIG. 2, the early warning method for a nitrogen concentration in industrialized aquaponic circulating water provided in the present disclosure is applied in the computer device of the early warning system for a nitrogen concentration in industrialized aquaponic circulating water and includes the following steps.

Step 210, video data of a sensitive fish farming container is obtained, where the video data includes a monitored movement behavior of a sensitive fish in the sensitive fish farming container, and the sensitive fish farming container is in communication with a farming pond of an aquaponic system.

Specifically, the computer device is capable of obtaining the video data transmitted in real time by a photographing apparatus and intercepting video data of a preset video duration to analyze the behavior activity of the sensitive fish, thus predicting a nitrogen concentration of the aquaponic system.

In one embodiment, the nitrogen concentration of the aquaponic system may be predicted according to a preset cycle.

Step 220, the video data is processed using an object detection model and a behavior activity of the sensitive fish is obtained according to a processing result.

Specifically, the behavior activity includes an activity amount, acceleration times, and tail wagging times. The object detection model is utilized to perform object detection on the video data and perform individual identification and three-dimensional tracking on the sensitive fish in the video data to obtain the activity amount, the acceleration times, and the tail wagging times of the sensitive fish. The activity amount may refer to a movement distance of the sensitive fish within the video duration; the acceleration times may refer to times of sudden acceleration of the sensitive fish within the video duration; and the tail wagging times may refer to a number of tail wagging behaviors of the sensitive fish within the video duration.

The object detection model performs individual identification and tracking on the sensitive fish in the video data, where a major task f a convolutional layer and a pooling layer of the object detection model is to extract and select a data feature. A size of the pooling layer is set to 1, thereby being conducive to avoiding model overfitting.

In one embodiment, the object detection model may be a model established with a You Only Look Once (YOLO) model as a framework. In one example, the object detection model may be a model established with a YOLOv7 model as a framework.

Step 230, the behavior activity is processed using a neural network model to obtain a nitrogen concentration grade of the farming pond of the aquaponic system.

Specifically, the nitrogen concentration of water in which the sensitive fish lives is predicted according to the obtained behavior activity of the sensitive fish using the neural network model, thereby obtaining the nitrogen concentration grade of the farming pond of the aquaponic system.

In one embodiment, step 230 may specifically include inputting the activity amount, the acceleration times, and the tail wagging times to the neural network model, and predicting a nitrogen concentration in the farming pond of the aquaponic system using the neural network model and determining the nitrogen concentration grade according to a prediction result.

In one embodiment, the neural network model may be a mode established with a long short-term memory (LSTM) model as a framework. The LSTM model has a unique advantage in predicting data. In long-term time series prediction, the LSTM model is capable of effectively avoiding the vanishing gradient problem.

Step 240, whether to send nitrogen concentration early warning information is determined based on the nitrogen concentration grade.

Specifically, a range of a total nitrogen concentration in water may be set to 0-20 mg/L, every 5 mg representing a nitrogen concentration grade, which may be represented using four colors. for example, nitrogen concentrations are represented by blue, yellow, orange, and red from low to high, respectively, where 0-5 mg/L is represented by blue, while 5 mg/L-10 mg/L represented by yellow, 10 mg/L-15 mg/L represented by orange, and 15 mg/L-20 mg/L represented by red. It may be set that when the predicted nitrogen concentration grade reaches yellow, orange, or red, the nitrogen concentration early warning information is transmitted to notify a worker, allowing the worker to take measures such as replacing the fluid in the farming pond of the aquaponic system in time.

The early warning method for a nitrogen concentration in industrialized aquaponic circulating water provided in the present disclosure can obtain the nitrogen concentration of the aquaponic system by farming the sensitive fish using water in the farming pond of the aquaponic system, picking up a video of the sensitive fish using the photographing apparatus, monitoring the movement behavior of the sensitive fish, performing object detection on the video data using the object detection model to obtain the behavior activity of the sensitive fish (the fish has different behavior activities in water environments at different nitrogen concentrations), and obtaining the nitrogen concentration corresponding to the behavior activity of the sensitive fish using the neural network model, and can determine whether early warning information is transmitted based on the nitrogen concentration, allowing a worker to know rapidly. The present disclosure provides a non-contact detection method using the computer vision technology, which does not require destructive operations such as individual dissection to be performed on fish and vegetable in the aquaponic system. Besides, changes may occur rapidly in fish behaviors due to a change in nitrogen concentration in water, and such changes may be more significant and earlier than inherent physiological changes. The behavior response of the sensitive fish used in the present disclosure is more significant and earlier than that of a farmed fish with an economic value in the farming pond of the aquaponic system. Thus, the present disclosure allows for rapid and accurate diagnosis of the nitrogen concentration in water of the aquaponic system, and early warning, thereby guaranteeing the survival of the farmed fish with high economic value in the aquaponic system. Furthermore, the cheap sensitive fish is used as a detection object, resulting in a low cost. Moreover, compared with an optical spectrum instrument and a sensor in the prior art, the early warning system of the present disclosure is low in failure rate, low in operation and maintenance costs, and capable of real-time monitoring. The problems of unstable early warning, low efficiency, and the like for a nitrogen concentration in the aquaponic system can be effectively solved. Thus, the healthy growth status of the farmed fish in the aquaponic system can be fed back in real time.

The obtaining of three indicators of the behavior activity is described in detail below.

1. Activity Amount

For the obtaining of the activity amount, step 220 may specifically include the following steps.

(1) The video data is decomposed into a plurality of top-viewing image frames and side-viewing image frames according to a preset unit time, where the video data includes top-viewing video data and side-viewing video data.

Specifically, the preset unit time may be set to 1 second. That is, the video data is decomposed into image frames by one frame per second. The top-viewing video data is decomposed into top-viewing image frames and the side-viewing video data is decomposed into side-viewing image frames. The top-viewing image frames and the side-viewing image frames are matched according to time stamps such that the top-viewing image frame and the side-viewing image frame of the same time stamp are in one-to-one correspondence.

In one example, the video duration of the video data may be set to 30 minutes. Thus, the top-viewing video data of 30 minutes is decomposed into 1800 top-viewing image frames, and the side-viewing video data of 30 minutes is decomposed into 1800 side-viewing image frames.

(2) Object detection is performed on the sensitive fish in the top-viewing image frames and the side-viewing image frames using the object detection model and a three-dimensional movement locus of the sensitive fish is obtained according to an object detection result.

Specifically, object detection is performed on the top-viewing image frames and the side-viewing image frames and individual identification and tracking are performed on the sensitive fish in the image frames, and then the three-dimensional movement locus of the sensitive fish is drawn.

In one embodiment, the three-dimensional movement locus may be drawn by identifying and tracking the head of the sensitive fish.

(3) A movement distance of the sensitive fish in each preset unit time is obtained according to the three-dimensional movement locus.

Specifically, the position distributions of the sensitive fish in adjacent image frames may differ, and the position distribution difference is the movement distance of the sensitive fish in the preset unit time.

(4) A plurality of movement distances are accumulated to obtain the activity amount of the sensitive fish within a video duration of the video data.

2. Acceleration Times

For the obtaining of the acceleration times, step 220 may specifically include the following steps.

(1) A movement velocity of the sensitive fish in each preset unit time is obtained according to the three-dimensional movement locus and the movement distance.

(2) The movement velocity is compared with a preset movement velocity threshold and the acceleration times of the sensitive fish within the video duration are determined according to a comparison result.

Specifically, at the early stage, the movement velocities of the sensitive fish may be collected and averaged to obtain an average movement velocity as the preset movement velocity threshold. With the three-dimensional movement locus and the movement distance, the movement velocity within each preset unit time may be calculated. Each movement velocity calculated is compared with the preset movement velocity threshold. When the movement velocity exceeds the preset movement velocity threshold, it may be regarded as acceleration of the sensitive fish. Thus, the acceleration times of the sensitive fish within the video duration are obtained.

In one embodiment, for the sensitive fishes of different types, different movement velocity thresholds may be set. In this way, the object detection model may also detect the type of the sensitive fish in the video data, and then the corresponding preset movement velocity threshold is used for comparison.

It needs to be noted that since it is difficult to calculate the individual acceleration of the fish, the number of sudden velocity changes (sudden acceleration) of the sensitive fish within unit time, i.e., the acceleration times, is selected in the present disclosure to replace the acceleration indicator. The sudden acceleration behavior of the fish may represent an important parameter of the individual swim behavior and the health status of the fish.

3. Tail Wagging Times

For the obtaining of the tail wagging times, the side-viewing image frames may be used, or the top-viewing image frames may be used.

In the case of using the side-viewing image frames, step 220 may specifically include the following steps.

(1) Object detection is performed on a tail of the sensitive fish in each side-viewing image frame using the object detection model and an area proportion of the tail in a first preset label box is obtained.

Specifically, the object detection model may identify the tail of the sensitive fish. The first preset label box is set as a tail label box and the size of the tail of the sensitive fish is determined as the size of the first preset label box. The size of the tail may be represented may be represented by the flat area of the tail, and the area of the first preset label box can be determined according to the flat area of the tail. In one example, it may be set that the flat area of the tail of the sensitive fish accounts for 95% of the label box.

(2) When the area proportion is less than a preset proportion value, it is determined that the sensitive fish has a tail wagging behavior within the preset unit time.

It will be understood that when the sensitive fish wags the tail, the tail area of the sensitive fish shown in the side-viewing image frame is smaller than the flat area of the tail. It may be set to determine that the sensitive fish has a tail wagging behavior when the tail area proportion is less than the preset proportion value. In one example, the preset proportion value may be 90%.

(3) The tail wagging times of the sensitive fish within the video duration are determined according to a number of the tail wagging behaviors.

Specifically, the number of the tail wagging behaviors of the sensitive fish within the video duration is counted, thereby obtaining the tail wagging times within the video duration.

In the case of using the top-viewing image frames, step 220 may specifically include the following steps.

(1) Object detection is performed on the tail of the sensitive fish in each top-viewing image frame using the object detection model and a position of the tail in a second preset label box is obtained.

(2) When the position does not coincide with a preset reference line within the second preset label box, it is determined that the sensitive fish has a tail wagging behavior within the preset unit time.

(3) The tail wagging times of the sensitive fish within the video duration are determined according to a number of the tail wagging behaviors.

Specifically, when the top-viewing image frames are used, object detection may be performed on the tail of the sensitive fish, and the tail in the top view is detected. The preset reference line is set in the second preset label box, which is a straight line. When the sensitive fish does not wag the tail, the tail of the sensitive fish is linear and coincides with the preset reference line. When the sensitive fish wags the tail, the tail of the sensitive fish does not coincide with the preset reference line, thereby determining whether the sensitive fish has a tail wagging behavior within the preset unit time. The number of the tail wagging behaviors of the sensitive fish within the video duration is counted, thereby obtaining the tail wagging times within the video duration.

It needs to be noted that, as described above, when the sensitive fish farming container includes a plurality of sensitive fish, the sensitive fish may be covered in the side-viewing video data, and the side-viewing video data may be combined with the top-viewing video data to obtain the tail wagging times of the sensitive fishes within the video duration.

Regarding the training of the object detection model, the video data of the sensitive fishes farmed in water at different nitrogen concentrations may be collected at the early stage and decomposed into image frames, and a region of interest is manually labeled. The region of interest may include the head of the sensitive fish and the tail of the sensitive fish. The labeled data may be regarded as training data to train the object detection model established with the YOLOv7 model as the framework into a model capable of performing individual identification and three-dimensional tracking on the sensitive fish. The behavior activity data of the sensitive fish is calculated according to the object detection result.

Regarding the training of the neural network model, the obtained behavior activity data and the corresponding nitrogen concentration data are used as training data to train the neural network model established with the LSTM model as the framework into a model having good robustness and capable of predicting the nitrogen concentration grade of the aquaponic system according to the behavior activity data of the sensitive fish.

In conclusion, the present disclosure utilizes the computer vision technology to monitor the behavior activity of the sensitive fish and is a non-contact monitoring method. Besides, changes may occur rapidly in fish behaviors due to a change in nitrogen concentration in water, and such changes may be more significant and earlier than inherent physiological changes. The behavior response of the sensitive fish is more significant and earlier than that of a farmed fish with an economic value in the farming pond. Therefore, the computer vision technology is utilized to analyze the behavior changes of the sensitive fish so that early warning can be given for the nitrogen concentration in advance to a certain extent. By combining machine vision with object detection model analysis, the fish behavior data is comprehensively calculated and the activity degree of the fish under different ammonia nitrogen concentration conditions can be fully reflected. Furthermore, in combination with the neural network model, the behavior parameters of the fish can be associated with the nitrogen concentration of the aquaponic system more comprehensively and more reliably.

Moreover, the present disclosure does not need any biochemical reagent and will not cause damage to the aquaponic farming environment. Moreover, the whole monitoring and diagnosis process may not interfere with the normal operation of the system, does not take a lot of time in analysis, and may perform real-time monitoring on the fish behaviors. The established early warning system for a nitrogen concentration based on a sensitive fish is stable, high in robustness, not prone to failure, low in cost, and capable of real-time detection, and can effectively solve the problems of unstable early warning, low efficiency, and the like for a nitrogen concentration in the aquaponic system and feed the healthy growth status of the farmed fish back in real time. Data fusion is performed on the present disclosure and an existing measurement method by a sensor. Thus, the nitrogen concentration in the aquaponic system can be accurately measured using the sensor and effective prediction and early warning may also be realized for the nitrogen concentration, especially when the sensor has a failure. Thus, double assurance is provided for ensuring efficient operation of the aquaponic system. The present disclosure has broad application prospects and high application value and can be industrialized.

An early warning apparatus for a nitrogen concentration in industrialized aquaponic circulating water provided in the present disclosure is described below. The early warning apparatus for a nitrogen concentration in industrialized aquaponic circulating water described below may correspond to the early warning method for a nitrogen concentration in industrialized aquaponic circulating water described above.

Figure 3:
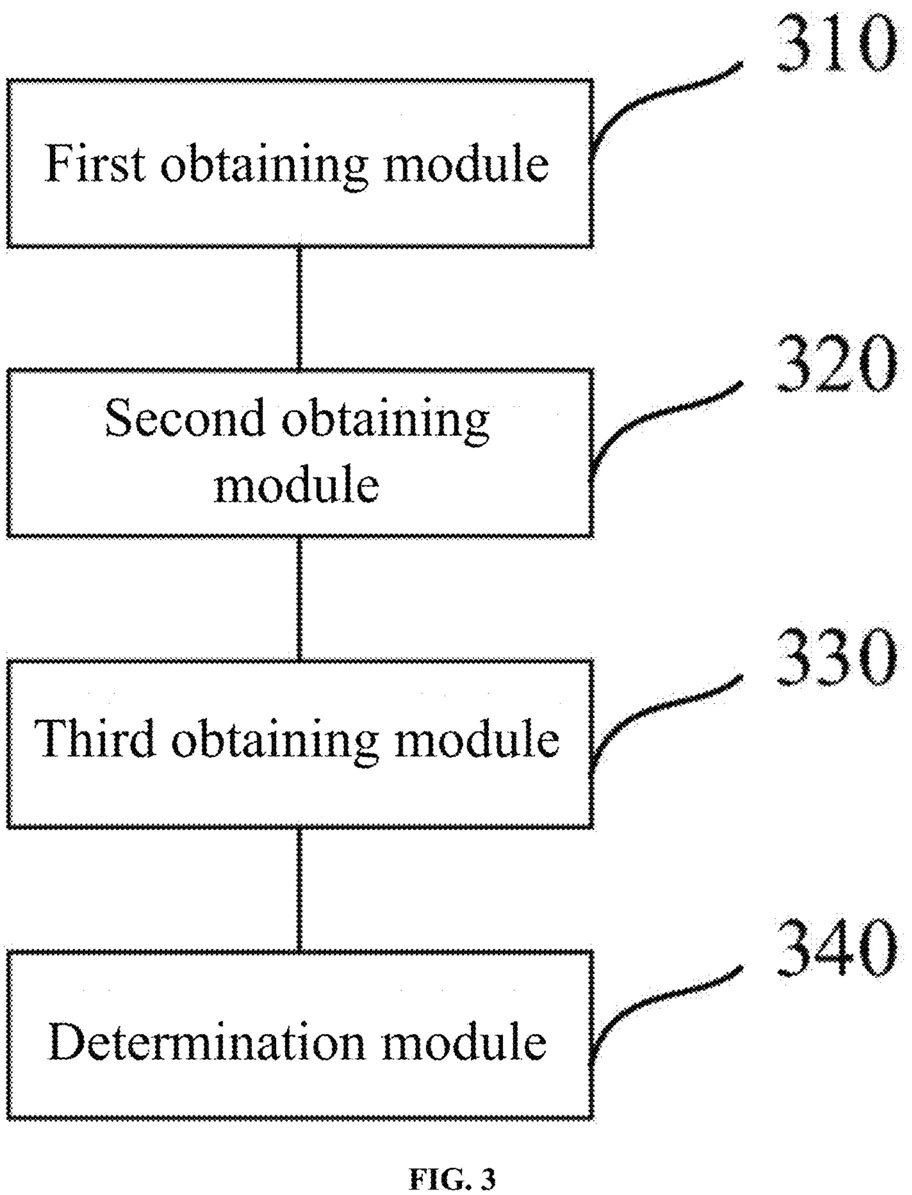
FIG. 3 is a structural schematic diagram of an early warning apparatus for a nitrogen concentration in industrialized aquaponic circulating water provided in the present disclosure.

As shown in FIG. 3, the present disclosure further provides an early warning apparatus for a nitrogen concentration in industrialized aquaponic circulating water, including:

a first obtaining module 310 configured to obtain video data of a sensitive fish farming container, where the video data includes a monitored movement behavior of a sensitive fish in the sensitive fish farming container, and the sensitive fish farming container is in communication with a farming pond of an aquaponic system;

a second obtaining module 320 configured to process the video data using an object detection model and obtain a behavior activity of the sensitive fish according to a processing result;

a third obtaining module 330 configured to process the behavior activity using a neural network model to obtain a nitrogen concentration grade of the farming pond of the aquaponic system; and a fourth obtaining module 340 configured to determine whether to send nitrogen concentration early warning information based on the nitrogen concentration grade.

Figure 4:
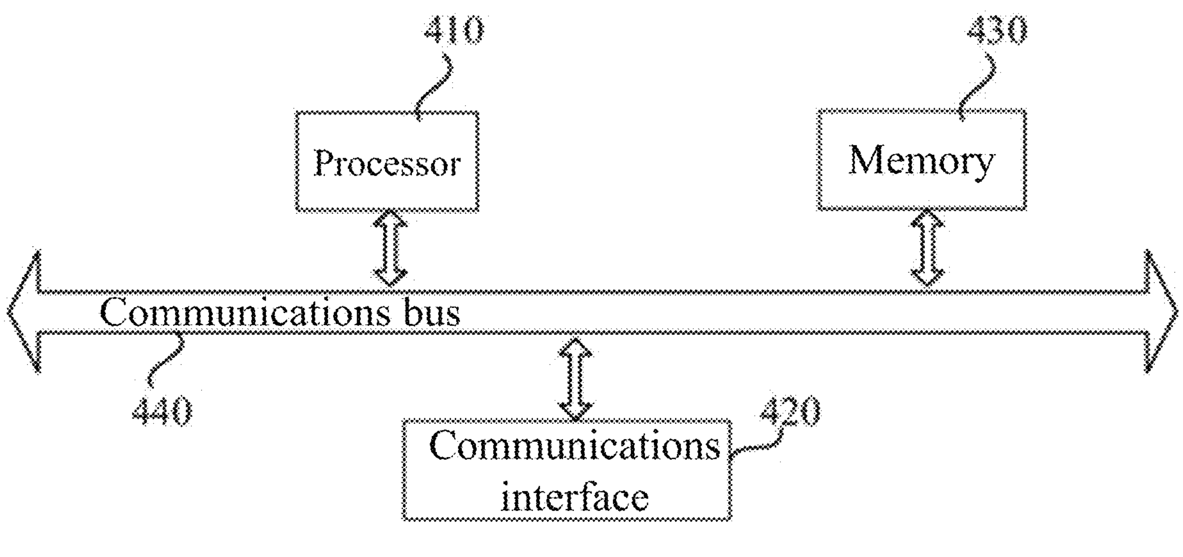
FIG. 4 is a structural schematic diagram of an electronic device according to the present disclosure.

FIG. 4 illustrates a schematic diagram of a physical structure of an electronic device. As shown in FIG. 4, the electronic device may include a processor 410, a communications interface 420, a memory 430, and a communications bus 440, where the processor 410, the communications interface 420, and the memory 430 communicate with one another through the communications bus 440. The processor 410 may invoke logic instructions in the memory 430 to perform an early warning method for a nitrogen concentration in industrialized aquaponic circulating water. The early warning method includes: obtaining video data of a sensitive fish farming container, where the video data includes a monitored movement behavior of a sensitive fish in the sensitive fish farming container, and the sensitive fish farming container is in communication with a farming pond of an aquaponic system; processing the video data using an object detection model and obtaining a behavior activity of the sensitive fish according to a processing result; processing the behavior activity using a neural network model to obtain a nitrogen concentration grade of the farming pond of the aquaponic system; and determining whether to send nitrogen concentration early warning information based on the nitrogen concentration grade.

Besides, the logic instructions in the memory 430 may be implemented as a software function unit and be stored in a computer-readable storage medium when sold or used as a separate product. Based on such understanding, the technical solution of the present disclosure which is essential or a part contributing to the prior art or a part of the technical solution may be embodied in the form of a software product, the computer software product is stored in a storage medium and includes a plurality of instructions for causing a computer device (which may be a personal computer, a server, or a network device) to execute all or some steps of the method according to each embodiment of the present disclosure. The foregoing storage medium includes a USB flash disk, a mobile hard disk, a read-only memory (ROM), a random access memory (RAM), a magnetic disk, an optical disk, or the like, which can store program code.

In another aspect, the present disclosure further provides a computer program product. The computer program product includes a computer program. The computer program may be stored on a non-transitory computer-readable storage medium, and when executed by a processor, may cause a computer to perform an early warning method for a nitrogen concentration in industrialized aquaponic circulating water described above. The early warning method includes: obtaining video data of a sensitive fish farming container, where the video data includes a monitored movement behavior of a sensitive fish in the sensitive fish farming container, and the sensitive fish farming container is in communication with a farming pond of an aquaponic system; processing the video data using an object detection model and obtaining a behavior activity of the sensitive fish according to a processing result; processing the behavior activity using a neural network model to obtain a nitrogen concentration grade of the farming pond of the aquaponic system; and determining whether to send nitrogen concentration early warning information based on the nitrogen concentration grade.

In still another aspect, the present disclosure further provides a non-transitory computer-readable storage medium on which a computer program is stored. The computer program, when executed by a processor, implements an early warning method for a nitrogen concentration in industrialized aquaponic circulating water described above. The early warning method includes: obtaining video data of a sensitive fish farming container, where the video data includes a monitored movement behavior of a sensitive fish in the sensitive fish farming container, and the sensitive fish farming container is in communication with a farming pond of an aquaponic system; processing the video data using an object detection model and obtaining a behavior activity of the sensitive fish according to a processing result; processing the behavior activity using a neural network model to obtain a nitrogen concentration grade of the farming pond of the aquaponic system; and determining whether to send nitrogen concentration early warning information based on the nitrogen concentration grade.

The apparatus embodiment described above is merely schematic, where the unit described as a separate component may or may not be physically separated, and a component displayed as a unit may or may not be a physical unit, that is, the component may be located at one place, or distributed on multiple network units. Some or all of the modules may be selected based on actual needs to achieve the objectives of the solutions of the embodiments. A person of ordinary skill in the art can understand and implement the embodiments without creative efforts.

Through the description of the foregoing implementations, a person skilled in the art can clearly understand that the implementations can be implemented by means of software plus a necessary universal hardware platform, or certainly, can be implemented by hardware. Based on such understanding, the foregoing technical solution which is essential or a part contributing to the prior art may be embodied in the form of a software product, the computer software product may be stored in a computer readable storage medium, such as an ROM/RAM, a magnetic disk or an optical disk, including a plurality of instructions for causing a computer device (which may be a personal computer, a server, or a network device) to perform the methods described in the examples or some parts of the examples.

Finally, it should be noted that the foregoing embodiments are only used to illustrate the technical solutions of the present disclosure, and are not intended to limit the present disclosure. Although the present disclosure is described in detail with reference to the foregoing embodiments, a person of ordinary skill in the art should understand that he/she can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

What is claimed is:

1. An early warning method for a nitrogen concentration in industrialized aquaponic circulating water, comprising:

obtaining video data of a sensitive fish farming container, wherein the video data comprises a monitored movement behavior of a sensitive fish in the sensitive fish farming container, and the sensitive fish farming container is in communication with a farming pond of an aquaponic system;

processing the video data using an object detection model and obtaining a behavior activity of the sensitive fish according to a processing result;

processing the behavior activity using a neural network model to obtain a nitrogen concentration grade of the farming pond of the aquaponic system;

determining whether to send nitrogen concentration early warning information based on the nitrogen concentration grade; and setting a range of a total nitrogen concentration in water to 0-20 mg/L, configuring a nitrogen concentration grade for every 5 mg by using four colors of blue, yellow, orange, and red to represent nitrogen concentrations from low to high, wherein 0-5 mg/L is represented by blue, 5 mg/L-10 mg/L is represented by yellow, 10 mg/L-15 mg/L is represented by orange, and 15 mg/L-20 mg/L is represented by red, and sending the nitrogen concentration early warning information when a monitored nitrogen concentration grade reaches yellow, orange, or red, to notify a worker of taking measures of replacing water in the farming pond of the aquaponic system in time.

2. The early warning method for a nitrogen concentration in industrialized aquaponic circulating water according to claim 1, wherein the behavior activity comprises an activity amount, acceleration times, and tail wagging times.

3. The early warning method for a nitrogen concentration in industrialized aquaponic circulating water according to claim 2, wherein the processing the video data using an object detection model and obtaining a behavior activity of the sensitive fish according to a processing result comprise:

decomposing the video data into a plurality of top-viewing image frames and side-viewing image frames according to a preset unit time, wherein the video data comprises top-viewing video data and side-viewing video data;

performing object detection on the sensitive fish in the top-viewing image frames and the side-viewing image frames using the object detection model and obtaining a three-dimensional movement locus of the sensitive fish according to an object detection result;

obtaining a movement distance of the sensitive fish in each preset unit time according to the three-dimensional movement locus; and accumulating a plurality of movement distances to obtain the activity amount of the sensitive fish within a video duration of the video data.

4. The early warning method for a nitrogen concentration in industrialized aquaponic circulating water according to claim 3, wherein the processing the video data using an object detection model and obtaining a behavior activity of the sensitive fish according to a processing result further comprise:

obtaining a movement velocity of the sensitive fish in each preset unit time according to the three-dimensional movement locus and the movement distance; and comparing the movement velocity with a preset movement velocity threshold and determining the acceleration times of the sensitive fish within the video duration according to a comparison result.

5. The early warning method for a nitrogen concentration in industrialized aquaponic circulating water according to claim 4, wherein the neural network model is a mode established with a long short-term memory (LSTM) model as a framework.

6. The early warning method for a nitrogen concentration in industrialized aquaponic circulating water according to claim 3, wherein the processing the video data using an object detection model and obtaining a behavior activity of the sensitive fish according to a processing result further comprise:

performing object detection on a tail of the sensitive fish in each side-viewing image frame using the object detection model and obtaining an area proportion of the tail in a first preset label box;

when the area proportion is less than a preset proportion value, determining that the sensitive fish has a tail wagging behavior within the preset unit time; and determining the tail wagging times of the sensitive fish within the video duration according to a number of the tail wagging behaviors.

7. The early warning method for a nitrogen concentration in industrialized aquaponic circulating water according to claim 6, wherein the neural network model is a mode established with a long short-term memory (LSTM) model as a framework.

8. The early warning method for a nitrogen concentration in industrialized aquaponic circulating water according to claim 3, wherein the processing the video data using an object detection model and obtaining a behavior activity of the sensitive fish according to a processing result further comprise:

performing object detection on the tail of the sensitive fish in each top-viewing image frame using the object detection model and obtaining a position of the tail in a second preset label box; and when the position does not coincide with a preset reference line within the second preset label box, determining that the sensitive fish has a tail wagging behavior within the preset unit time; and determining the tail wagging times of the sensitive fish within the video duration according to a number of the tail wagging behaviors.

9. The early warning method for a nitrogen concentration in industrialized aquaponic circulating water according to claim 8, wherein the neural network model is a mode established with a long short-term memory (LSTM) model as a framework.

10. The early warning method for a nitrogen concentration in industrialized aquaponic circulating water according to claim 3, wherein the neural network model is a mode established with a long short-term memory (LSTM) model as a framework.

11. The early warning method for a nitrogen concentration in industrialized aquaponic circulating water according to claim 2, wherein the processing the behavior activity using a neural network model to obtain a nitrogen concentration grade of the farming pond of the aquaponic system comprises:

inputting the activity amount, the acceleration times, and the tail wagging times to the neural network model; and predicting a nitrogen concentration in the farming pond of the aquaponic system using the neural network model and determining the nitrogen concentration grade according to a prediction result.

12. The early warning method for a nitrogen concentration in industrialized aquaponic circulating water according to claim 11, wherein the neural network model is a mode established with a long short-term memory (LSTM) model as a framework.

13. The early warning method for a nitrogen concentration in industrialized aquaponic circulating water according to claim 2, wherein the neural network model is a mode established with a long short-term memory (LSTM) model as a framework.

14. The early warning method for a nitrogen concentration in industrialized aquaponic circulating water according to claim 1, wherein the neural network model is a mode established with a long short-term memory (LSTM) model as a framework.

* * * * *